United States Patent

Bierlein et al.

[19]

[11] Patent Number: 5,842,380

[45] Date of Patent: Dec. 1, 1998

[54] SHIFT YOKE

[75] Inventors: John C. Bierlein, Shelby Township; Alan R. Davis, Plainwell; Marcel Amsallen, Kalamazoo; Mark L. Lanting, Portage; Douglas C. Gooch, Richland, all of Mich.

[73] Assignee: Eaton Corporation, Cleveland, Ohio

[21] Appl. No.: 789,115

[22] Filed: Jan. 27, 1997

[51] Int. Cl.[6] ........................................... G05G 3/00
[52] U.S. Cl. .................... 74/473.37; 192/82 R; 184/13.1
[58] Field of Search .............................. 192/82 R, 113.33, 192/113.5, 69.91, 99 A, 99 S; 74/473.36, 473.37; 184/11.1, 13.1

[56] References Cited

U.S. PATENT DOCUMENTS

| 3,587,783 | 6/1971 | Walters et al. ........................ 184/13.1 |
| 4,495,831 | 1/1985 | Takahashi ............................ 74/473.37 |
| 4,754,665 | 7/1988 | Vandervoort .............................. 74/745 |
| 4,920,815 | 5/1990 | Reynolds .................................. 74/335 |
| 5,027,672 | 7/1991 | Salvatori et al. ................... 74/473.37 |
| 5,201,237 | 4/1993 | Berndtson ............................. 74/473 R |
| 5,390,561 | 2/1995 | Stine ....................................... 74/331 |

FOREIGN PATENT DOCUMENTS 54-144582  11/1979  Japan .................................. 192/99 S

*Primary Examiner*—Richard M. Lorence
*Attorney, Agent, or Firm*—Howard D. Gordon

[57] ABSTRACT

A shift yoke (10) defining contact pads (18, 20) for axially engaging contact surfaces (22) on a relatively rotating clutch member (12). Inlet ramps (34, 36) are provided at the upstream ends of the contact pads to provide an inlet (36) for directing lubricant between the axially engaging surfaces.

4 Claims, 2 Drawing Sheets

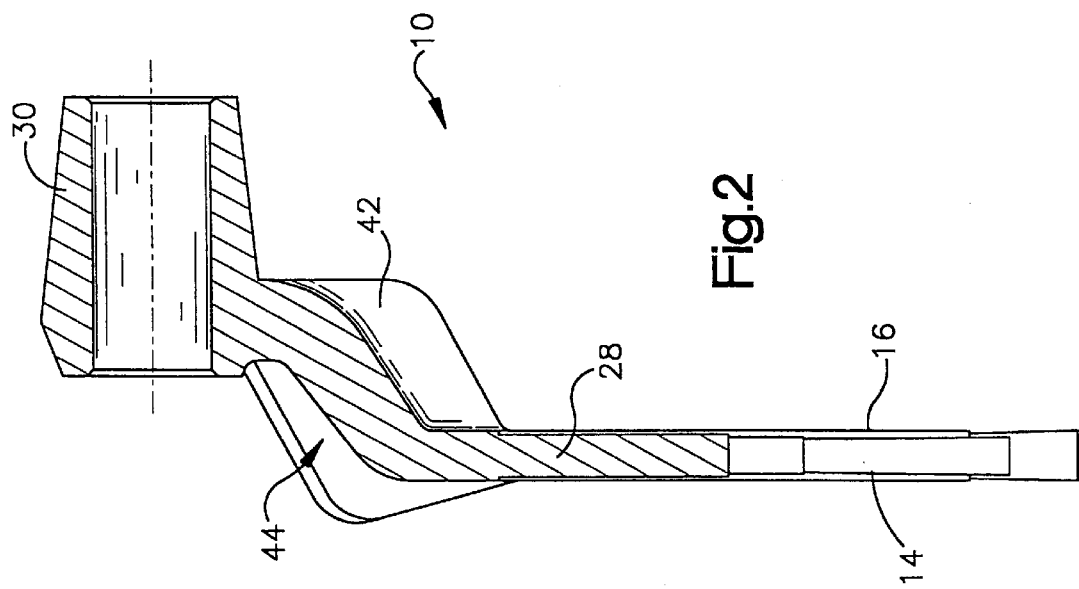
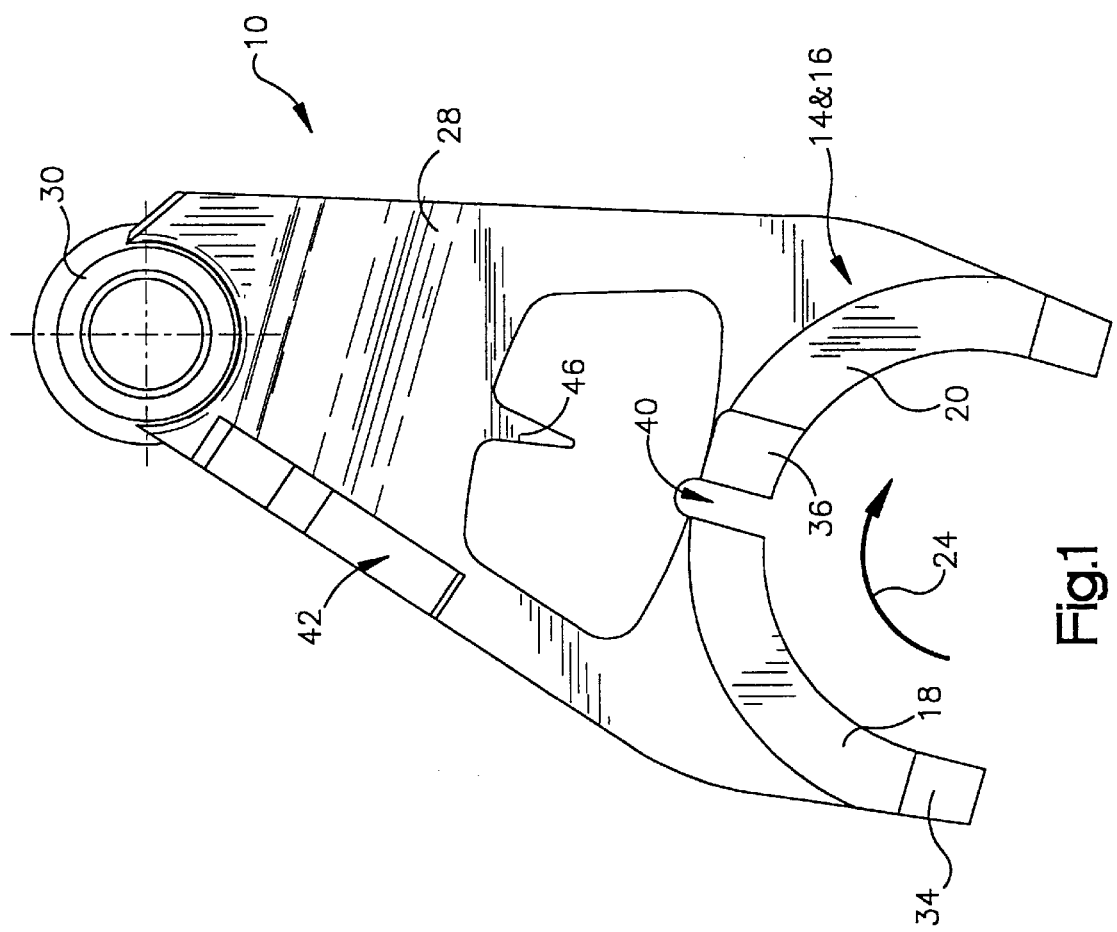

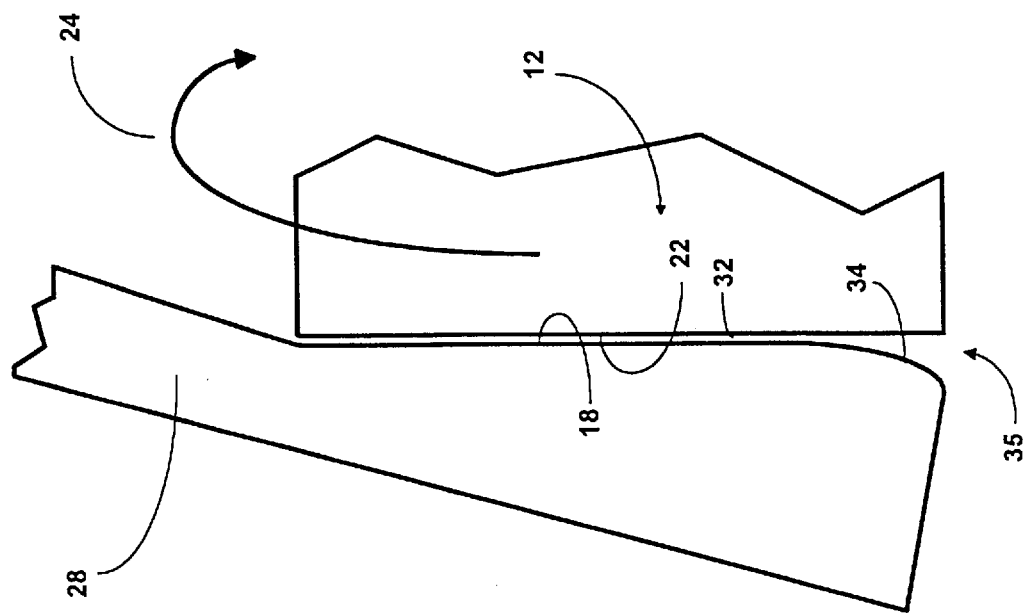
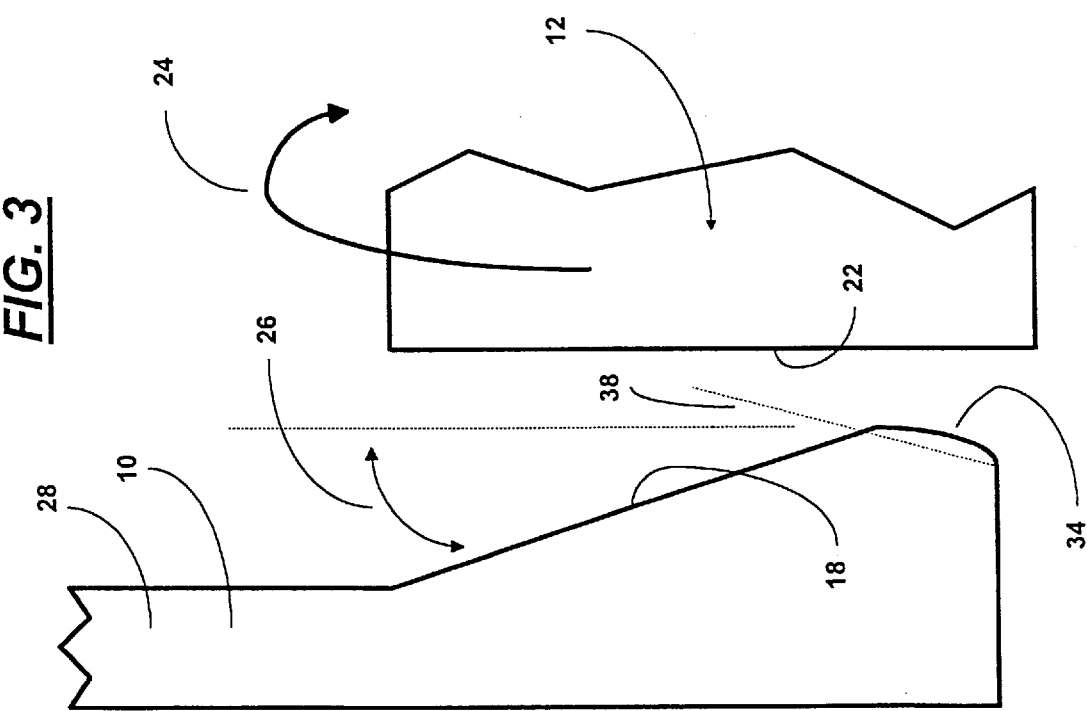

SHIFT YOKE

BACKGROUND OF THE INVENTION

1. Field of the Invention

The present invention relates to shift yokes, also called shift forks, for selectively axially positioning axially engaged and disengaged clutch members. In particular, the present invention relates to structural features which improve the lubrication of the shift yoke surfaces, or contact pads, engaging relatively rotating surfaces of abutted clutch members.

2. Description of the Prior Art

Vehicular drive train components utilizing axially engaged and disengaged clutches, such as transmissions and drive axles, of both the synchronized and non-synchronized type, are well known in the prior art, as may be seen by reference to U.S. Pat. Nos. 4,315,698; 4,754,665; 5,390,561 and 4,597,312, the disclosures of which are incorporated herein by reference. Shifting mechanisms, usually including shift forks or shift yokes for controlling the axial positioning of the engageable and disengageable clutch members, also are well known in the prior art, as may be seen by reference to U.S. Pat. Nos. 4,353,449; 4,531,623; 4,920,815; 5,000,060 and 5,201,237, the disclosures of which are incorporated herein by reference.

As may be seen by reference to U.S. Pat. No. 5,201,237, to minimize wear, it is known to back-taper the longitudinal wear surfaces by an angle generally equal to expected deflection of the shift yoke.

While vehicular drive train components using clutches shifted by shift forks are widely used and highly successful, they are subject to improvement, as shift fork wear, especially in heavy-duty applications, may be greater than desired.

SUMMARY OF THE INVENTION

In accordance with the present invention, the drawbacks of the prior art are minimized or overcome by providing an improved shift yoke having improved lubrication of the contact surfaces of the contact pads. The foregoing is accomplished by providing a relatively shallow entry ramp at the circumferential entry to the contact pads. Preferably, a cross-slot will be provided at the top of the yoke's arcuate opening to define a lubricant entry portion for the downstream pad and to allow lubricant access thereto. Various collecting ribs and the like also may be utilized to enhance lubricant supply to the inlet ramp of the downstream contact pad. Preferably, the entry ramps are relatively shallow and generally arcuate to enhance the tendency for lubricant to be sheared into the contact area to maintain a film of lubricant between the contact pad surfaces and the contacted surfaces of the associated clutch member.

Accordingly, it is an object of the present invention to provide a new and improved shift yoke.

This and other objects and advantages of the present invention will become apparent from a reading of the following description of the preferred embodiment taken in connection with the attached drawings.

BRIEF DESCRIPTION OF THE DRAWINGS

FIG. 1 is a front view of the shift yoke of the present invention.

FIG. 2 is a side view, in section, of the shift yoke of FIG. 1.

FIGS. 3 and 3A are enlarged, schematic illustrations of a portion of the shift yoke of the present invention.

DESCRIPTION OF THE PREFERRED EMBODIMENT

Certain terminology will be used in the following description of the preferred embodiment for convenience only and will not be limiting. The terms "upwardly," "downwardly," "rightwardly" and "leftwardly" will designate directions in the drawings to which reference is made. The terms "inwardly" and "outwardly" will refer, respectively, to directions toward and away from the geometric center of the device described. The terms "forward" and "rearward" will refer, respectively, to the front and rear ends of the drive train components as conventionally mounted in the vehicle, being to the left and right sides of the various drive train components, as illustrated in FIG. 1. The terms "clockwise" and "counterclockwise" will refer to rotational directions as viewed from the front of the vehicle, as shown in FIG. 1. Said terminology includes the words above specifically mentioned, derivatives thereof and words of similar import.

As is well known in the prior art, and as may be seen in the drawings, shift fork or shift yoke 10 is commonly utilized to axially position an axially engageable and disengageable clutch member 12. Typically, the shift fork will define a pair of opposed contact surfaces 14 and 16 for axially engaging a pair of opposed contact surfaces defined in the clutch member. Typically, the clutch member is provided with a radially, inwardly extending groove or slot which will receive the legs of the shift fork. In the particular embodiment illustrated in the drawings, the contact surface 14 of shift fork 10 defines a pair of contact pads 18 and 20 for engagement with a contact surface 22 defined by the clutch member 12, which is rotating relative to the shift fork or shift yoke 10 in a direction indicated by arrow 24. While the illustrated embodiment utilizes a pair of contact pads on each contact surface of the shift yoke 10, it is understood that the present invention is also applicable to those shift yokes utilizing a single contact pad or three or more contact pads.

As may best be seen by reference to FIGS. 3 and 3A, which are enlarged schematic illustrations exaggerated for purposes of illustration, the contact pads 18 and 20 are back-tapered relative to the substantially flat contact surface 22 of clutch 12 by an amount 26 equal to about 0.5 degrees to 2.5 degrees, which is substantially equal to the expected deflection of the shift lever arm 28 when moving clutch member 12 rightwardly against a resistance, as is illustrated in FIG. 3A. As is described in aforementioned U.S. Pat. No. 5,201,237, this back-taper will thus allow contact pad 18 and contact surface 22 to be in substantially surface-to-surface contact when the shift fork 10 is moving the clutch 12 against a resistance to minimize wear on the various contact surfaces.

In view of clutch member 12 rotating relative to shift fork 10 in the direction illustrated by arrow 24, contact pad 18 may be considered the upstream contact pad, while contact pad 20 may be considered the downstream contact pad. The arm 28 of the shift fork 10 carries a hub member 30 for attachment to a shift rail, a single shift shaft (as illustrated in aforementioned U.S. Pat. No. 4,920,815), or to a fluid actuator piston or the like.

As is well known, clutches and shift yokes of the type illustrated in the drawings are typically associated with vehicular drive train mechanisms having a lubricant sump and/or forced lubrication system whereby lubricant is splashed, directed and/or sprayed on the various bearings, shafts, gears and the like. To minimize wear between the contact pad of shift yoke 10 and the wear surface 22 of clutch 12, it is important to maintain a film of lubricant in the space 32 therebetween. To accomplish this, the shift yokes of the present invention include an entry ramp 34 and 36 at the upstream end of the contact pads 18 and 20, respectively, relative to the direction of rotation of clutch member 12. Preferably, the entry ramps 34 and 36 will be generally arcuate in shape and, as may best be seen by reference to FIG. 3A, will define a relatively shallow lubricant entrance to the space 32 between the contact surfaces 18 and 22 for shearing lubricant into that space to maintain a film of lubricant between the contact surfaces. The relatively shallow arc 34 creates a relatively shallow inlet 35 for feeding lubricant into the contacting surfaces. In the non-deflected condition of the shift yoke 10, a cord joining the ends of the arcuate ramp 34 should define a back-tapered angle 38 of about 0.5 degrees to 2.0 degrees relative to the contact surface 22.

To provide an improved lubricant flow to the entry ramp 36 for the downstream contact pad 20, a cross-notch 40 may be provided to promote lubricant flow thereto and/or lubricant-collecting ribs 42 and 44 and a lubricant drip member 46 also may be provided to enhance lubricant flow to the entry ramp 36 to the downstream pad.

Accordingly, it may be seen that a new and improved shift yoke is provided which will provide enhanced lubricant flow between the contact surfaces thereof and the contact surfaces of an engaged clutch member to minimize wear thereof.

Having thus described the preferred embodiment of the present invention, it should be understood that numerous structural modifications and adaptations may be resorted to without departing from the spirit and scope of the invention as hereinafter claimed.

We claim:

1. A shift yoke for axially contacting, in a given axial direction, a contact surface on a clutch member rotatable relative to said yoke in a given direction of rotation (24), said yoke defining first (18) and second (20) generally arcuate contact pads for contacting said contact surface, said yoke characterized by:

a first inlet ramp (34) leading into said first contact paid at the circumferential end thereof opposite said direction of rotation, said first inlet ramp progressively axially tapering away from said given axial direction in said direction of rotation; and a second inlet ramp (36) leading into said second contact pad at the circumferential end thereof opposite said direction of rotation, said second inlet ramp progressively axially tapering away from said given axial direction in said direction of rotation.

2. The shift yoke of claim 1 wherein each of said contact pads tapers progressively, axially away from contact surface in the direction of rotation.

3. The shift yoke of claim 1 wherein said inlet ramps are generally arcuate, defining a generally convex surface facing in the axial direction.

4. The shift yoke of claim 1 wherein said second inlet ramp is provided with lubricant passages for receiving exterior lubricant.

* * * * *